(12) United States Patent
Urbanic

(10) Patent No.: US 10,052,812 B2
(45) Date of Patent: Aug. 21, 2018

(54) METHOD OF REDUCING AND OPTIMISING PRINTED SUPPORT STRUCTURES IN 3D PRINTING PROCESSES

(71) Applicant: UNIVERSITY OF WINDSOR, Windsor (CA)

(72) Inventor: Jill Urbanic, Windsor (CA)

(73) Assignee: UNIVERSITY OF WINDSOR, Windsor, ON (CA)

( * ) Notice: Subject to any disclaimer, the term of this patent is extended or adjusted under 35 U.S.C. 154(b) by 466 days.

(21) Appl. No.: 14/993,544

(22) Filed: Jan. 12, 2016

(65) Prior Publication Data

US 2016/0200051 A1 Jul. 14, 2016

Related U.S. Application Data

(60) Provisional application No. 62/102,627, filed on Jan. 13, 2015.

(51) Int. Cl.

| | | |
|---|---|---|
| *B29C 67/00* | (2017.01) | |
| *B28B 1/00* | (2006.01) | |
| *B29C 64/106* | (2017.01) | |
| *B29C 64/386* | (2017.01) | |
| *B29C 64/40* | (2017.01) | |
| *B33Y 10/00* | (2015.01) | |
| *B33Y 50/02* | (2015.01) | |
| *B29K 1/00* | (2006.01) | |
| *B29K 105/00* | (2006.01) | |

(52) U.S. Cl.
CPC .......... *B29C 64/106* (2017.08); *B29C 64/386* (2017.08); *B29C 64/40* (2017.08); *B29K 2001/00* (2013.01); *B29K 2105/0058* (2013.01); *B29K 2995/0037* (2013.01); *B33Y 10/00* (2014.12); *B33Y 50/02* (2014.12)

(58) Field of Classification Search
CPC ..... B29C 64/40; B29C 64/386; B29C 64/106; B33Y 50/02; B33Y 10/00; B29K 2001/00; B29K 2105/0058; B29K 2995/0037
See application file for complete search history.

(56) References Cited

U.S. PATENT DOCUMENTS

| | | | | |
|---|---|---|---|---|
| 5,345,391 A | * | 9/1994 | Hull ................. | B29C 64/40 156/273.3 |
| 5,943,235 A | * | 8/1999 | Earl .................. | B29C 41/36 345/420 |
| 6,193,923 B1 | * | 2/2001 | Leyden ............. | B29C 41/12 264/308 |
| 7,591,078 B2 | * | 9/2009 | Crampton ......... | B25J 13/088 33/503 |
| 8,496,474 B2 | * | 7/2013 | Chishti ............. | A61C 7/00 433/24 |
| 2005/0253308 A1 | * | 11/2005 | Sherwood ........ | B29C 35/0805 264/497 |

(Continued)

*Primary Examiner* — Ramesh Patel

(57) ABSTRACT

A printed target model is formed by 3D printing by inputting target model data, and based on target model data, identifying surface portions requiring support. The surface portions are projected onto a virtual printer table, and one or more virtual support structures having a V-shaped cap portion and optionally a generally planar web are created therefore. The virtual model is then used to control a 3D printer to integrally print-form the target model and support structures.

22 Claims, 14 Drawing Sheets

(56) References Cited

U.S. PATENT DOCUMENTS

| | | | |
|---|---|---|---|
| 2008/0206383 A1* | 8/2008 | Hull | B33Y 30/00 425/135 |
| 2009/0267269 A1* | 10/2009 | Lim | B29C 67/0059 264/401 |
| 2014/0048970 A1* | 2/2014 | Batchelder | B29C 67/0055 264/129 |
| 2014/0371895 A1* | 12/2014 | Sadusk | B33Y 10/00 700/98 |

* cited by examiner

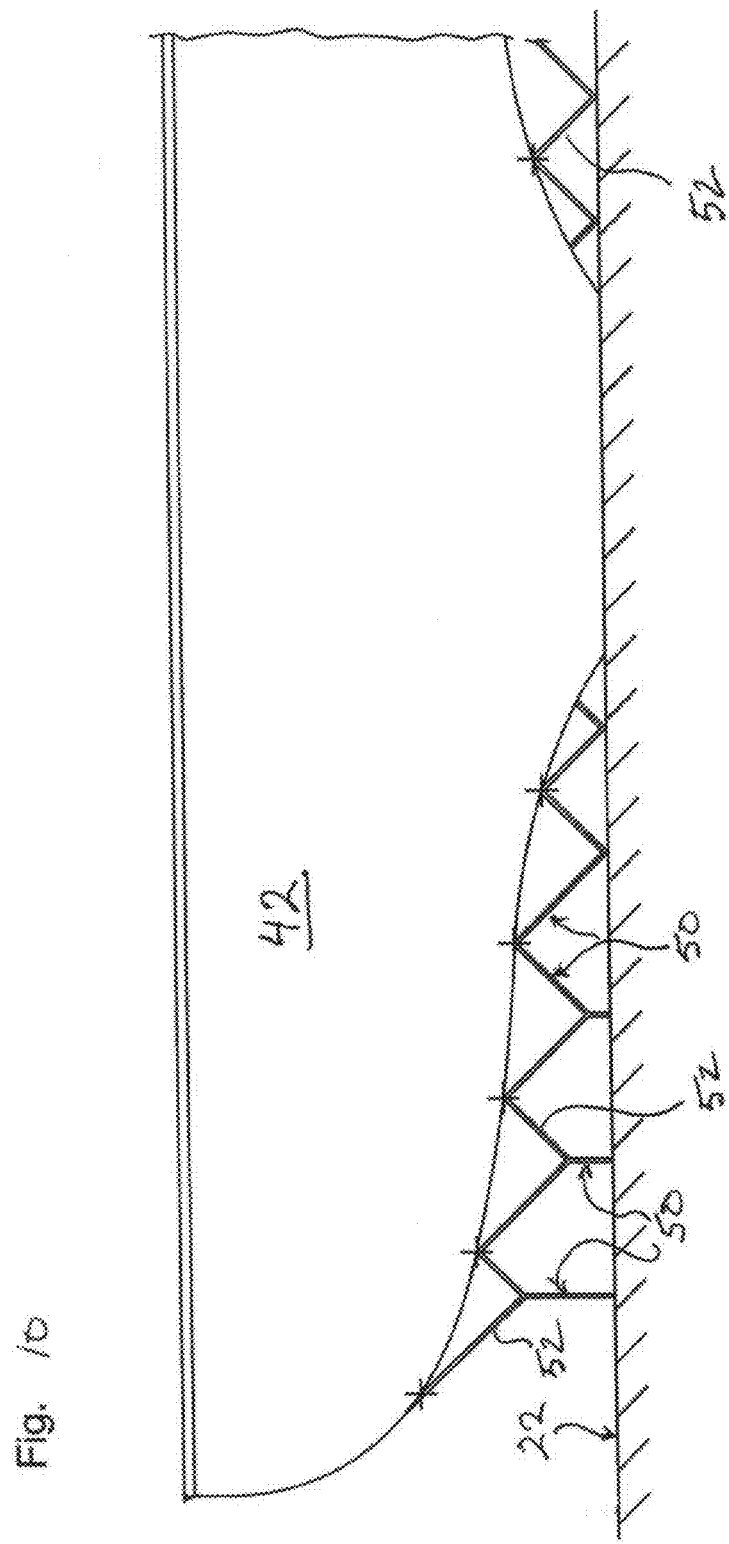

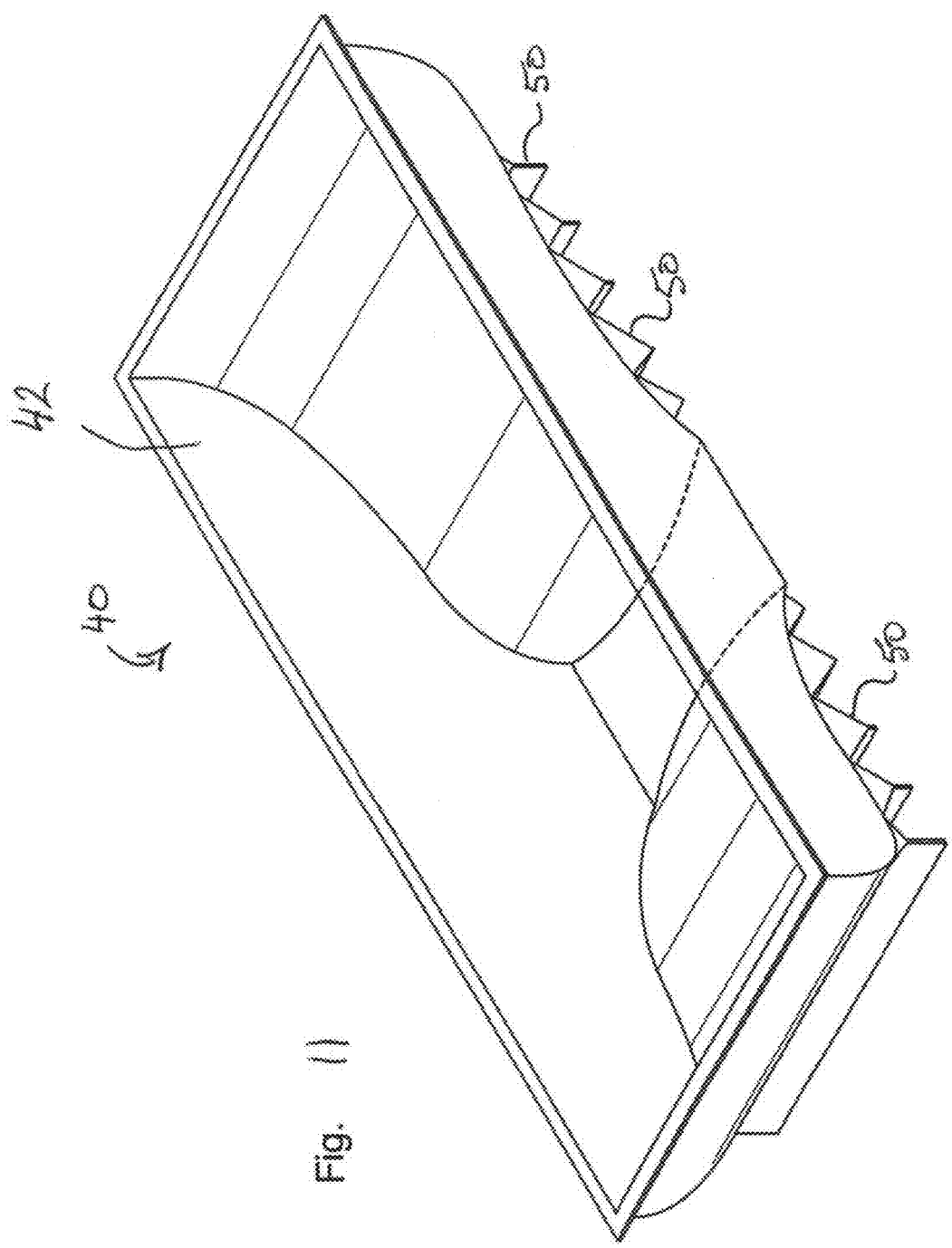

METHOD OF REDUCING AND OPTIMISING PRINTED SUPPORT STRUCTURES IN 3D PRINTING PROCESSES

RELATED APPLICATIONS

This application claims priority to and the benefit of 35 USC § 119(c) to U.S. Patent Application Ser. No. 62/102,627, filed Jan. 13, 2015, the entirety of which is incorporated herein by reference.

SCOPE OF THE INVENTION

The present invention relates to a method and apparatus for reducing and optimising the amount of printed support structure material used in printing target models or other articles or structures which are formed by three-dimensional (3D) printing processes.

BACKGROUND OF THE INVENTION 3D printing is able to build complex and functional three dimensional objects or target models front various metals, plastic polymers, paper, and modified clays. When printing three-dimensional articles or target models, the printed article will be subject to a threshold overhang angle of departure. The threshold overhang angle is the maximum angle relative from vertical at which the part of the model may be printed without collapsing or deforming during printing and/or material curing. The threshold overhang angle may further more be predetermined having regard to factors including the type and composition of the material used in print-forming the article, as well as the material deposition rate and thickness.

Conventionally in the 3D printing of polymers, a supporting material or structure is often printed concurrently with the target model to temporarily support the model material while it cools and solidifies. Typically, support structures are provided in the form of a solid mass structure or fine vertical lattice structure. Frequently, such support structures may extend vertically from the printer table to the underside of the model areas needing support. As well, often the volume of printed support material uses is as much, or even more than the source printed material used to form the target model. This adds both considerable cost and time to the 3D printing of certain target model configurations.

Conventional 3D printing technology uses an angle deviation criteria for each material used to identity the areas in the model that require support during the printing process. From this, monolithic support structures are typically designed extending vertically to locations requiring support and which exceed the threshold overhang angle. As noted, this process often results in the printing of more support structure material than the material which is contained in the actual target model. After printing and model solidification, the support structures are separated from the formed target model and disposed of. Both the material and machine lime to place and form the support material is a necessary non-value added cost.

SUMMARY OF THE INVENTION

The present invention relates primarily to 3D printing systems, and more particularly, a process and apparatus for forming printed support structures for use in the temporary support of a target model during 3D model printing, cooling and/or solidification. More preferably, the present invention provides an improved method, design and apparatus for forming polymer, plastic and other temporary support structures from a chosen printer material, using a 3D printer as part of a computer controlled 3D printing process operable to form a variety of different types of target models. It is envisioned that the present invention may be used with a number of different types of printer materials including without restriction, plastics, such as ABS, polylactic acid (PLA), PVA, as well us polycarbonates, metals and alloys, and mineral based materials.

More preferably, the areas of portions of the target model that require support during printing and/or curing are determined by identifying those portions which extend with a geometry which exceeds the threshold overhang angle, as the maximum angular departure from a vertical angle of zero where the proposed material for the target model can still support itself. This angle is preferably predetermined and is usually between about 40° to 50° from vertical depending on the material used, although it is not limited thereto. Portions of the target model oriented at angles greater than the predetermined overhang angle are preselected as those which generally will require underlying supporting structures during printing. The final maximum threshold overhang angle of departure for a particular target model will vary having regard to the curing rate and internal bonding strength of the selected model material, as well as the final geometry of the portion of the model which is to be formed.

The 3D printer is provided as port of a 3D printer system and includes a printer table or other suitable support on which the target model is formed by successive build-up or layer deposition using the printer. Preferably the 3D printer system is microprocessor controlled and includes a computer or processor having memory, prestored software and a display, allowing the user to input, view, manipulate and/or store target model parameters.

Although not essential, the printer system operates to produce concurrently with the formation of the target model, one or more 3D support structures underlying pre-identified the portions of the target model which exceed the maximum threshold overhang angle and which require support. Preferably, the support structures include a V-shaped cap portion which extends downwardly from the underside of the pre-identified portions requiring support to a lower vertex. A virtual support web column or wall (hereinafter collectively a web) may further project generally vertically from the printer table to merger with the lower vertex of the V-shape cap portion. The cap structure may be formed as a trough or V-shaped flange which merges integrally with the underside of an associated portion of the target model. More preferably, each longitudinal side of the V-shaped cap portion is provided in an angular orientation which equals or is less than the predetermined threshold overhang angle of the printing material used to form the target model.

In one possible process of manufacture, the V-shaped trough or cap portion may be infilled wholly or partially between each side with one or more printed gussets, lattice, and/or low density print material to a bottom surface of the identified portion of the target model requiring support. To minimize material usage, in an alternate construction, the cap portion may also be provided with an overall upwardly open V-shape.

Software stored in the processor memory is used to generate a virtual model representing the target model to be formed, relative lo the printer table. Thereafter, the processor may be used to manipulate the virtual model to a print orientation which optimizes printing speed, and more preferably which is selected to also minimize the amount of material required to complete the target model together with any necessary printed support structures. Each portion of the virtual model having a geometry which theoretically will exceed the threshold overhang angle during print formation is then identified. Optionally, one or more of the portions of the article requiring support may be discretized or further divided into geometric subsections.

For each portion or geometric subsection requiring support, a virtual longitudinal plane or web representing a long axis or the longest length of the portion is selected. The longitudinal plane represents a longitudinal orientation of at least one V-shaped cap portions of an underlying support structure and, if applicable, the support structure web. The generated virtual plane preferably extends normal from the virtual printer table.

Following the establishment of the long axis, a lateral axis extending normal thereto is then established at the widest lateral part of each associated portion requiring support. At the center of the lateral axis, a central axis parallel to the long axis is identified. In addition, if necessary two or more secondary axis parallel to the long axis may be identified, and preferably which are located at spaced intervals between the central axis and each end of the lateral axis.

Initially a virtual or trough-shaped geometry of the cap portion of a possible support structure is identified at the center axis relative to a model of each identified portion to be supported. Most preferably, the geometry is identified virtually by the processor whereby lines representative of the cap portion side walls laterally are projected inwardly and downwardly from each lateral side of an associated portion identified as requiring support, towards the center axis. The lines preferably project inwardly downward at an angle in the lateral directed selected equal or less than the predetermined threshold overhang angle of the material, and preferably between 1° and 7°, and most preferably 2 to 3° less than the preselected threshold overhang angle, having regard to print material to be used in forming the target model. In the case of workpieces formed from plastic materials, each line preferably projects inwardly downward to an angle of between 30° and 45° from vertical, and most preferably from 40° to 45° from the vertical orientation.

Where the vertical distance between the respective intersection points of each virtual line with the central axis vertical plane is less than the shortest distance between the underside of the target model und either intersection point, the microprocessor is used to identify secondary support axis parallel to the long axis between the central axis and each respective end of the lateral axis.

The processor thereafter generates separate parallel virtual cap portions, each with a lower vertex aligned with a respective second my support axis. Each separate cap portion is formed virtually by initially generating a first virtual cap portion side which extends at or less than the threshold overhang angle from an adjacent edge of the associated portion of the model downwardly to intersect the adjacent secondary axis. The second other side of each cap portion is then generated virtually, with the processor projecting the second side upwardly from the intersection point of the first side, to the point where the central axis joins the underside of the virtual model. The lower vertex then forms the support vertex that will follow the contour of the underside of the overhang in the longitudinal axis at this established standoff distance in the vertical direction.

It is to be appreciated that the upper edges of each side of the generated cap portion preferably follow the contour of the underside of the virtual model in the long axis direction.

The processor further is used to generate the virtual support web extending downwardly from the lower vertex of the cap portion sides to the virtual printer table, and aligned with the axis to complete each support structure. A cap portion for a next support structure is then virtually generated in the identical manner by extending virtual sides downwardly and inwardly at or less than the threshold overhang angle α from both the center axis and the opposing other edge of the identified portion. At the point where the next generated side walls intersect, a support web is projected vertically downwardly to the virtual printer table in an axial plane parallel to the center axis.

In the case where following in the initial generation of the cap portion geometry centered on the central plane, the vertical distance between the intersection points of each projected line with the central axis plane is greater than the shortest vertical distance between the underside of the target model and the nearest intersection point, the processor is used to generate the first virtual aide of the cap portion beginning at the edge of the portion requiring support which is spaced furthest from or above the printer table. The first virtual side extends at a downwardly inclined angel selected leas than or equal to the threshold overhang angle, and preferably between about 2° to 6° less than the threshold overhung angle to a point intersecting the central axis vertical plane.

From the intersection point with the center axis vertical plane, the second other side of the cap portion is virtually created, projecting upwardly from the center axis plane at the same inclined angle as the first side to intersect the underside of the virtual target model, and delineating virtually the side profiles of a V-shaped support structure cap portion.

Thereafter, the processor is used to model virtually a virtual support web extending downwardly from the lower vertex of the cap portion sides to the printer table.

Cap portions of next adjacent support structures are then generated virtually by projecting virtual sides downwardly and inwardly towards each other from respectively, the intersection point of the first cap portion side and the underside of the virtual target model, and the second other edge of the identified portion requiring support. The virtual sides of the next cap portion being inclined at the same overhang angle as the sides of the first generated cap portion.

The computer processor is used to generate print commands to the printer to print an associated virtual support web extending between the lower vertex of the next cap portion sides and the printer table to complete the support structure. In the case the vertex is below the virtual table the V-shapes are each divided in half again until all or all but one vertex is above the table level.

Preferably, the sides of the cap portion extend outwardly relative to the support web at locations spaced above the virtual printer table selected so that each side meets the underside of the identified portion requiring support at a widest possible point. Each cap portion may be infilled with the printer material to form a solid or partially open bearing surface for the model in the horizontal direction. In one possible construction, the V-shaped cap portion may be substantially infilled with a secondary low density printer formed support material. The low density material being selected to provide sufficient vertical support for the printed model, whilst reducing the volume of printer material required for support structure formation. Suitable low density infill material could for example include without restriction printed ABS or other plastic filaments.

Whilst not essential, most preferably the support structures and target model are made from a single material to facilitate their recycling following separation from the printed target model.

In another possible construction, the trough or cap portion is supported by a primed web which is formed having one or more axially spaced pillars, splayed or fanned tops and/or diamond-shaped cut outs, holes and/or other apertures to reduce the volume required model material. Where apertures or diamond-shaped cut outs are provided, preferably each of the sides of the web defining the aperture or diamond extend an angle relative to vertical no greater than the overhang angle of the material being used.

Following computer modelling, the computer is used to actuate the 3D printer to simultaneously print the target model und support structures in accordance with the generated virtual models. In a preferred method, the sides of the cap portion are formed so as to follow a contour of the target model to provide full three dimensional support. Depending on the size of the target model, over a given area of one or more model portion requiring support, as few as one and possibly multiple discrete support structures may be used. The support structures could include in the alternative or in addition to troughs, pillar and/or wall or web structures which are individually designed for the model size and weight of the target model being supported. Preferably, the support structures are provided to optimize the material used against the structure complexity of the target model, to increase the printing efficiency of the 3D printer.

The system printer may thus be activated to effect formation of required printer-formed supports in substantially the same locations on a target model as conventional printing processes, whilst depending on target model, using upto less than a quarter or more of the support material compared with conventional printing processes. It is recognized that printing of such support materials may thus be achieved in less time, whilst resulting in substantial material and time saving to produce the same 3D target model. Such time savings further may be used to increase production capacity on 3D printing machines, reducing costs.

The invention may also provide for a method of forming 3D primed support structures required to build various target model configurations in 3D printing, whilst using less material, and which in turn, reduces overall printing time. In a most simplified mode, printing of the support structures is achieved using the same or very similar hardware as those used to print the model itself. Printing may thus be performed using available 3D printing systems and which include without restriction, systems which operate by placing or depositing material by thermal plastic extrusion; as well as systems that deposit material through a specialized (i.e. dot Matrix) printing heads that place polymers with a binder material that adheres/fuse to already deposited material. In such systems the manufacturers may determine, based at least in part on the properties of the material used to form the target model, where the target model will require support structures to be built successfully.

BRIEF DESCRIPTION OP THE DRAWINGS

Reference may be had the following detailed description taken together with the accompanying drawings, in which:

FIGS. 10 and 11 show side wall perspective views of a 3D primed target model together with printed support structures formed in accordance with the present invention and using the printer assembly of FIG. 1; and FIGS. 12A to 12E illustrate perspective views of support structures generated using the printer assembly shown in FIG. 1, in accordance with alternate embodiments of the invention.

DETAILED DESCRIPTION OF THE PREFERRED EMBODIMENTS

Figure 1:
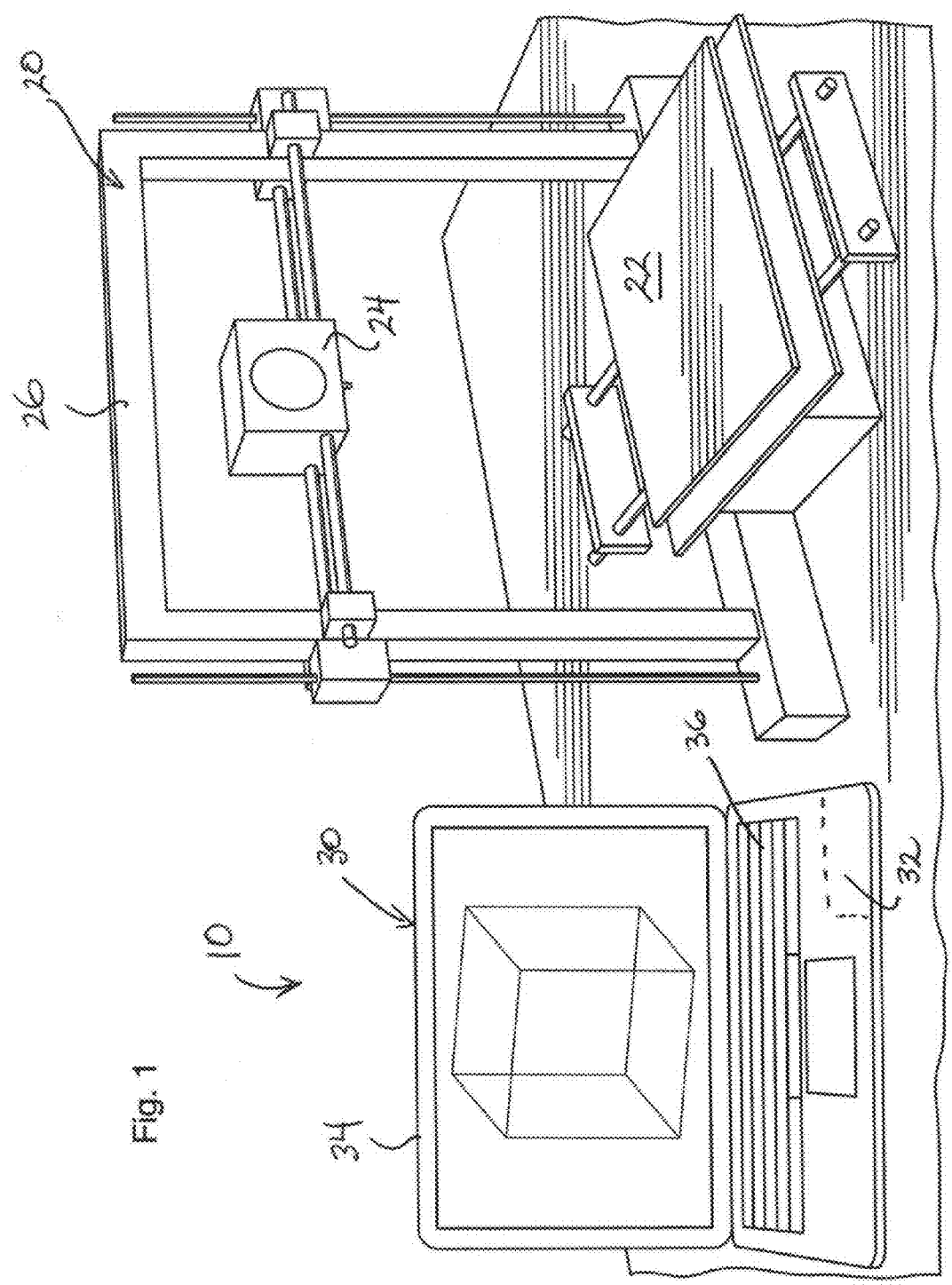
FIG. 1 show schematically a printer assembly for forming three-dimensional target models wing support structures in accordance with a preferred embodiment of the invention.
Figure 2:
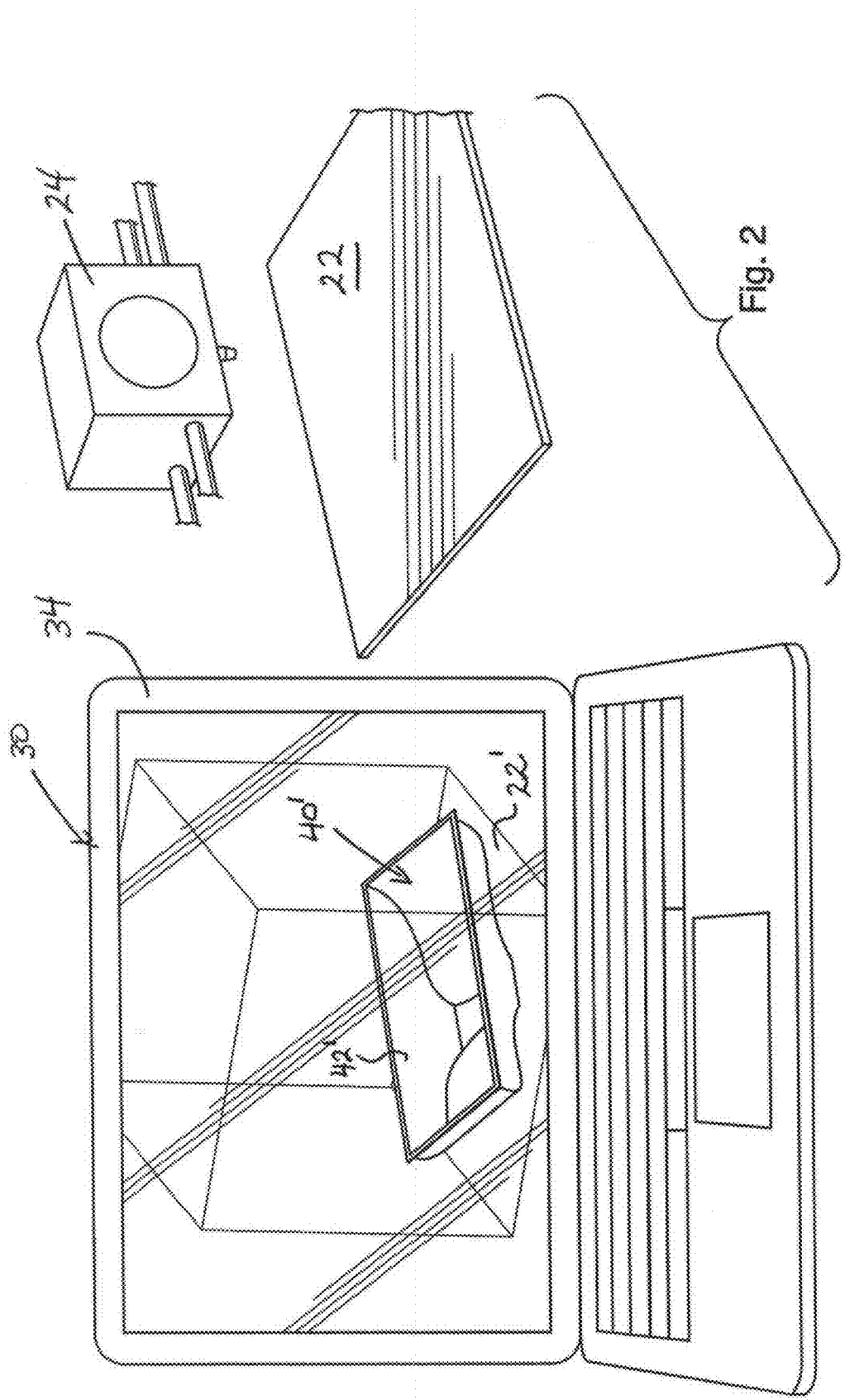
FIG. 2 shows schematically the generation of a virtual model of a target model in the form of a raised platform using the system of FIG. 1.

Reference may now be bad to FIG. 1 which illustrates a 3D printer assembly 10 in accordance with a preferred embodiment of the invention. The printer assembly 10 includes a 3D printer 20, having a printer table 22 and printer head 24 which is movable in three axis relative to the printer table 22 on a gantry frame 26. The 3D printer 20 is controlled a computer 30 which includes a proccessor 32 having memory, as well as a video display 34 and keyboard 36.

As will be described, the printer assembly 10 is operable for use in the automated design building of a selected target model 40 (shown in FIG. 11). In the detailed description, and by way of non-limiting example, the target model 40 is described and illustrated as raised platform 42. As will described, the raised platform 42 is structurally supported during formation by the printing process by way of one or more integrally formed 3D printed pillars or support structures 50.

Although not essential, most preferably the target model 40 and support structures 50 are formed from a single type of print material, and which is selected to minimize both the time and volume of printer material used to form the target model, whilst minimizing waste. Typically, the support structures 50 are formed from the model materials concurrently with the building or 3D printing of the target model 40, and which preferably consists of ABS, PVC, or PLA. Other materials may, however, be used. During printing, portions of the support structure 50 may be left hollow and others infilled with the designated print material for added structural integrity and support, to facilitate the rapid and cost effective building of the model by the 3D printer 20.

As shown best in FIG. 12A, the support structures 50 are provided with an upwardly oriented V-shaped cap portion 52 which underlies and serves to support respective portions of the target model 40 which require support during printing and/or material curing. The cap portion 52 includes a pair of side walls 54a,54b which extend from a lowermost vertex 56 upwardly and outwardly away from each other. As will be described, when print formed by the 3D printer 20 Each side 54a,54b is projected upwardly and outwardly relative to a vertical plane at an angle which extends from vertical equal to or less than, preferably 1 to 7° less than, and most preferably 2 to 4° less than, the preselected threshold overhang angle chosen having regard to the material to be used in printing the workpiece. Between the sidewalls 54a,54b the cap portion 52 is preferably infilled with a volume of low density support material 60, and which for example may be in the form of low density printed filaments. It is to be appreciated, however, that the cap portion 52 could be infilled with a number of different types of solid and/or partially open structures, including without restriction printed gussets, lattices, or rasters, depending upon the specific printer material and/or target model 40 to be formed. The support structures 50 may further include a virtual web 58 which extend generally vertically from the vertex 56 to engage the printer table 22 to provide the formed portions of the raised platform 42 with the necessary physical support.

The automated design and 3D printing of the raised platform 42 as an exemplary target work piece 40 is shown best with reference to FIGS. 2 to 10, and is preferably achieved in accordance with the process steps hereafter detailed:

1. Input of Target Model Data

Initially, target model data which is representative of the desired three dimensional raised platform to be printed is input into the system microprocessor 32. The input target model data is preferably used to establish a three dimensional virtual model of the platform 42' together with required support structures as a virtual version of the final target model 40' to be printed. Most preferably, the system processor 32 includes stored programme instructions which allows the user to manipulate the positioning of the virtual model 42' of the platform relative to a selected reference, and preferably a virtual image of the printer table 22'. In this manner the processor 32 may be used to select an optimum print orientation of the virtual model of the platform 42' relative to a virtual version of the 3D printer table 22' to minimize material requirements.

In particular, the virtual model or platform 42' is oriented to optimize printing and/or minimize unsupported areas of the raised platform which orient in positions which exceed the predetermined threshold overhang angle. Most preferably, the final model orientation is chosen to minimize the amount of material required for the formation of necessary underlying model support structures 50. Such virtual positioning thus advantageously may be used to configure the printing assembly 10 to minimize both the volume of material and time required for printing and material curing, as the raised platform 20 is physically formed by the 3D printer 20 in the printing process.

2. Identification of Support Areas

Once the optimum print orientation of the virtual raised platform 42' is determined, each of the areas or portions of the target model 40 which will require support by one or more support structures 50 during model printing and material curing are next identified.

Typically, the portions of the target model 40 requiring support during print-formation are selected as those which during model formation, extend with a selected geometry (i.e. thickness, extent, width, etc.) in orientation which exceeds the threshold overhang angle, and which typically diverges from at about 30° to 40°, and typically 40° to 50° from the vertical axis. The threshold overhang angle is selected as the predetermined angle at which a printed structure may be liable to collapse or deform either in initial printing of the raised platform 42 or during the time the printed material requires to cure and fully solidify. As noted, the final threshold overhang angle is predetermined and will vary depending on factors including the particular composition of the material to be used in forming the target model, as well as target model thickness, geometry and position relative to the printer table 22.

Figure 3:
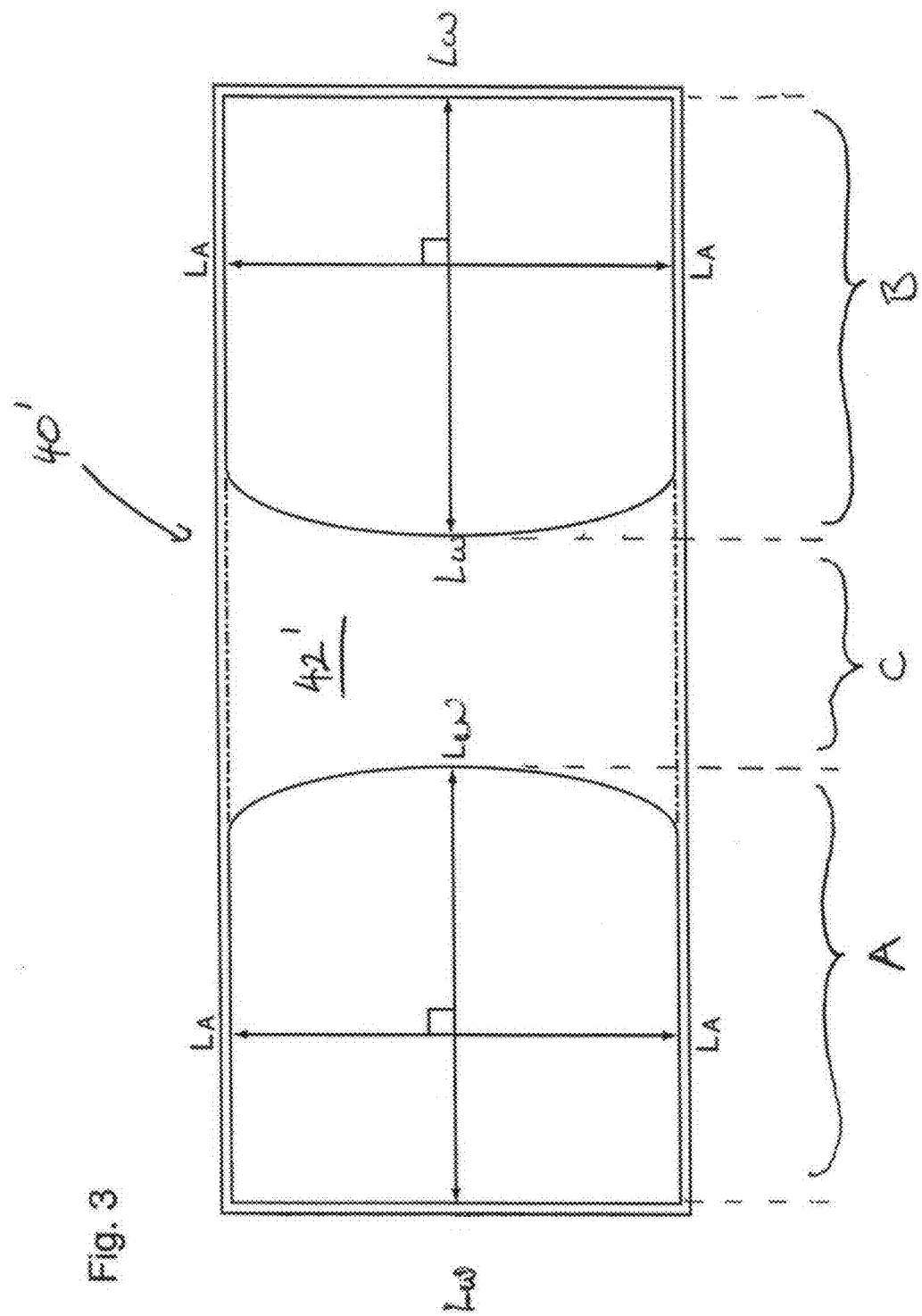
FIG. 3 illustrates graphically an output display illustrating pre-identification of the portions of the virtual model requiring support during 3D printing operations.

In the exemplary embodiment shown best in FIG. 3, end portions A and B of the virtual raised platform 42' are pre-identified as requiring support, with mid-portion C oriented for juxtaposition directly against the printer table 22, during print formation. It is to be appreciated that whilst FIG. 3 shows the virtual raised platform 42' as having only two portions A,B requiring support, more complex target models 40 may have greater number of discrete areas requiring support, depending on the geometry of the article to be formed.

Once the portions A,B of the target model 40' which will require support during 3D printing and/or material curing are identified, the microprocessor 32 is used to convert each surface portion A,B,C of the raised platform 42' to an associated planar image, viewed from a perspective normal to the surface of the printer table 22.

3. Identification of Long Axis

After the planar usage of each surface portion A,B is established, an associated long axis $L_A$-$L_A$ is determined. Most preferably, the long axis $L_A$-$L_A$ of each planar portions A,B is optimised and possibly reoriented to best bisect the planar image.

Where the identified portions A,B of the target work piece requiring support have a complex geometry, the projected planar images optionally may be further discretized into subsections comprising one or more preselected geometric shapes, each with its own longitudinal axis created as above. Such geometric shapes may, for example, be square or rectangular, having a respective longitudinal extending long-axis. Other geometric shapes having curved or bending longitudinal center-lines and points could however also be used.

4. Selection of Lateral Axis

Following the establishment of the initial longitudinal center-line long axis $L_A$-$L_A$, the lateral axis $L_W$-$L_W$ of each associated portion A,B planar image is next identified using the microprocessor 32. The lateral axis $L_W$-$L_W$ is located at a widest portion of the planar image for each portion A,B. Preferably the lateral axis $L_W$-$L_W$ is oriented perpendicular or near perpendicular to the long axis $L_A$-$L_A$. Where the projected planar image is provided with a rectangular or square shape having a constant width, the lateral axis $L_W$-$L_W$ may be positioned along any portion of the long axis $L_A$-$L_A$.

5. Determination of Support Axis Number and Placement

Following the establishment of the lateral axis $L_W$-$L_W$, a primary center support axis $A_C$-$A_C$ for each associated portion A,B is identified. The primary center support axis $A_C$-$A_C$ is chosen as an axis parallel to the long axis $L_A$-$L_A$ at the midpoint length of the lateral axis $L_W$-$L_W$.

Once the primary or center support axis $A_C$-$A_C$ is identified, the placement of any secondary support axis $A_S$-$A_S$ which are necessary and the determination of whether the cap portion 52 of any underlining support structures 50 is symmetrical or asymmetrical positioned is identified.

Using the processor 32, a virtual vertical cross-section of the area below a selected predetermined portion A between the virtual model 40' and virtual printer table 22' is formed. The cross-section is preferably generated at the widest lateral axis $L_W$-$L_W$. Support structures are next modeled, as shown in virtual side views of FIG. 4 and FIGS. 5A to 5D. Initially, lines $L_1$ and $L_2$ are projected downwardly and inwardly at a selected angle is chosen as the threshold overhang angle upto less about 2 to 10° from a respective each opposed outside-most edge points M, N of the underside of the portion A. The projected lines $L_1$,$L_2$ are extended downwardly an inward towards the axis $A_C$-$A_C$ until each line $L_1$,$L_2$ intersects at a respective line-intersection point O,P with a vertical plane of the center axis $A_C$-$A_C$. The spacing between the intersection points O,P of the projected lines $L_1$,$L_2$, and the distance between the underside of the virtual model 40' at point Q and the closest intersection point P along the plane of axis $A_C$-$A_C$ my next used to determine whether support cap portions 32 are to be formed with a symmetrical or asymmetrical spacing orientation.

I. Asymmetrical Spaced Support Configuration

As shown in FIG. 4 and FIGS. 5A to 5D, and if the vertical distance ($V_1$) from the underside of the portion of the virtual model 40' at axis point Q to the intersection point P of the lira closest line ($L_2$) along the plane of the axis $A_C$-$A_C$ is less than the vertical distance ($V_2$) between the respective intersection points P,Q of the first and second lines $L_1$,$L_2$ additional secondary support axis $A_{S1}$-$A_{S1}$, $A_{S2}$-$A_{S2}$ are created.

Figure 5A:
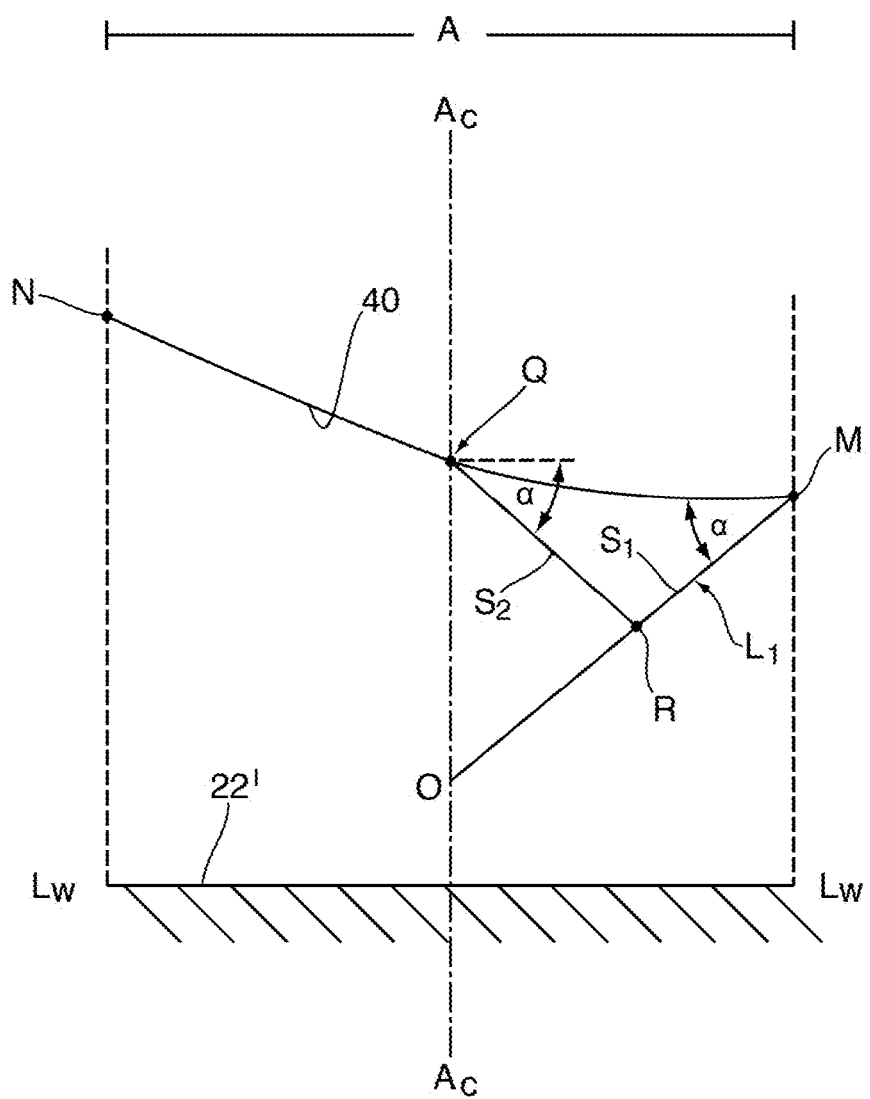
FIGS. 5A to 5D illustrate the virtual generation of the support cap portion geometry under a first selected portion of the target model requiring support.

As shown in FIG. 5A, initially line $L_1$ is selected, extending between points M, O at the preselected angle α, and which will be described, delineates in part a first side (shown as $S_1$) of a first support structure 44 and cap portion 52. A second virtual side of the cap portion 52 is projected from the axis point Q downwardly at the preselected angel α to intersect line $L_1$ at point R.

Figure 5B:
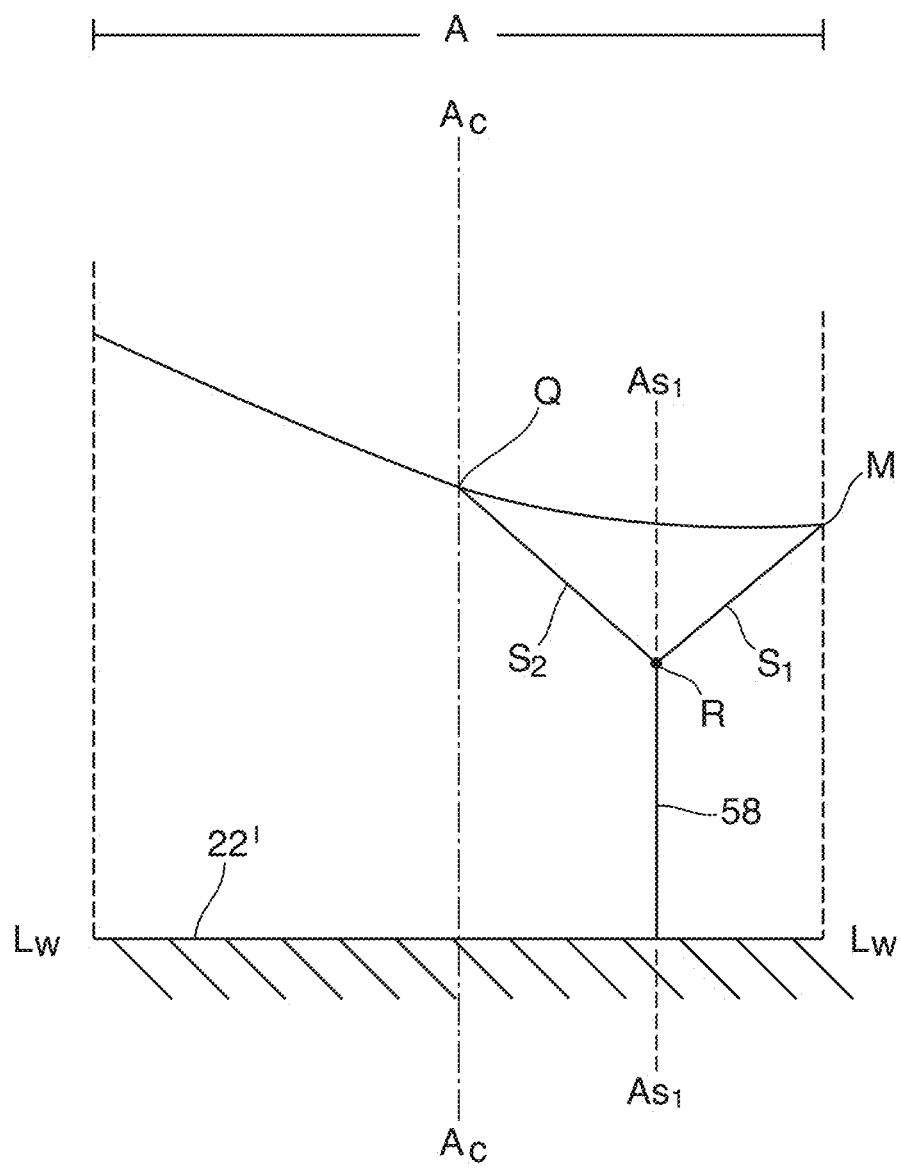

As shown in FIG. 5B, point R represents virtually the lower vertex of the virtual cap portion formed by the intersection of side portions $S_1$ and $S_2$. From point R, the computer 30 is used to create virtually a vertical plane extending downwardly to the virtual printer table 22', and which represents a virtual support web 58 which is co-planar with a secondary support axis $A_{S1}$-$A_{S1}$.

Figure 5C:
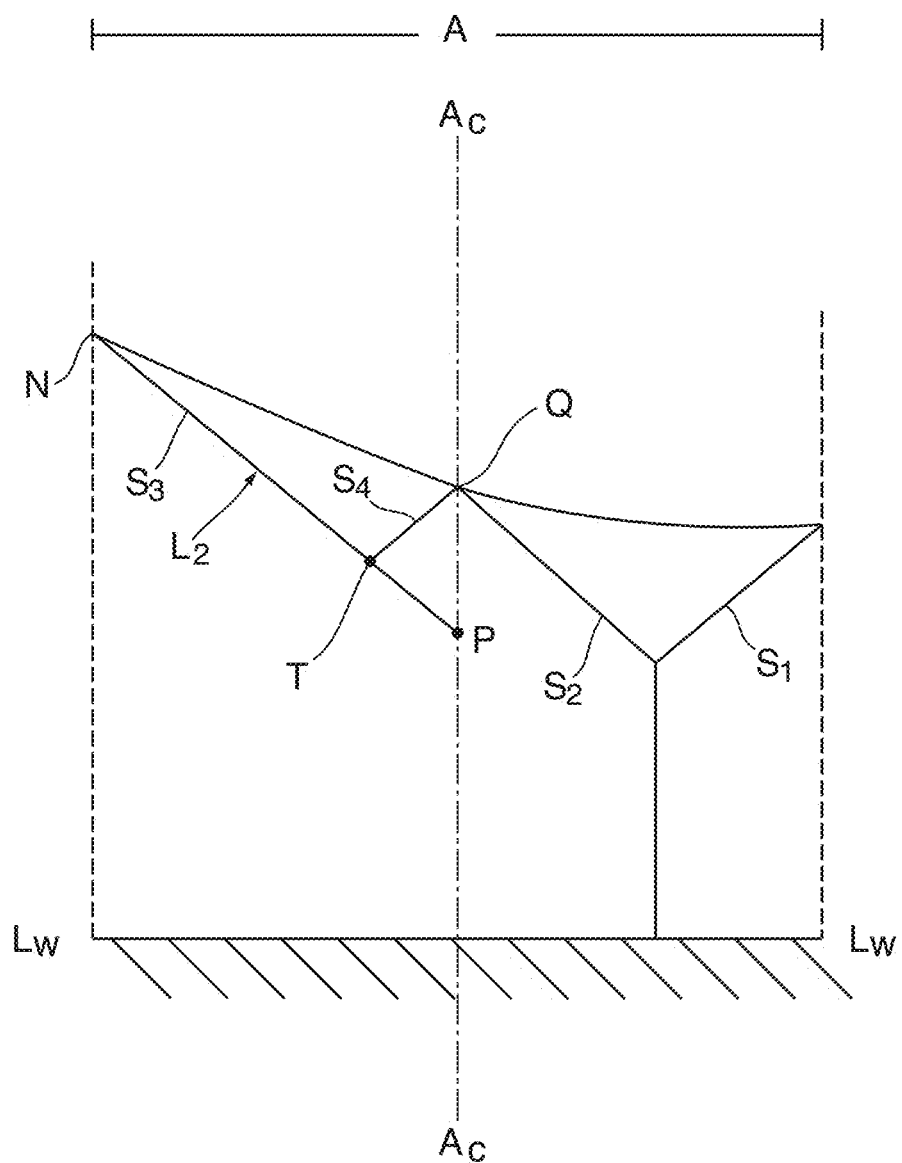
Figure 5D:
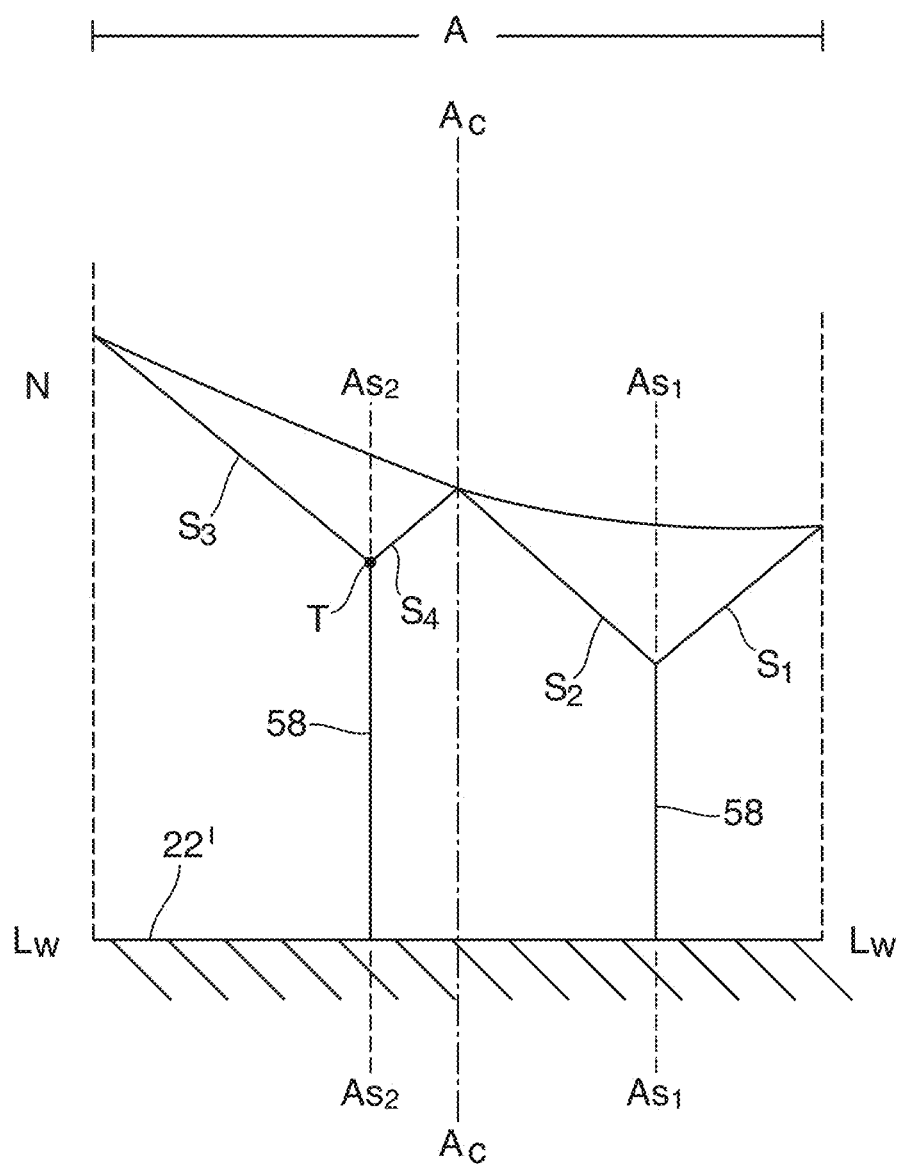

As shown in FIGS. 5C and 5D, a next adjacent virtual structure is preferably formed in a mirror manner. The initially generated line $L_2$ extending from points N to P is delineating in pan as a first side $S_3$ (FIG. 5D) of a next cap portion. A second associated virtual side $S_4$ is then generated, extending from axis point Q, downwardly of the predetermined angle α, to intersect line $L_2$ at point T. From point T a vertical plane is established downwardly to the virtual printer table 22' representing the position of a next support web 58, and which is co-planar with a secondary support axis $A_{S2}$-$A_{S2}$. The secondary support axis $A_{S2}$-$A_{S2}$ may be a symmetrically spaced between the virtual axis $A_C$-$A_C$ and the closest end of the area A relative to the spacing of axis $A_{S1}$-$A_{S1}$.

Figure 4:
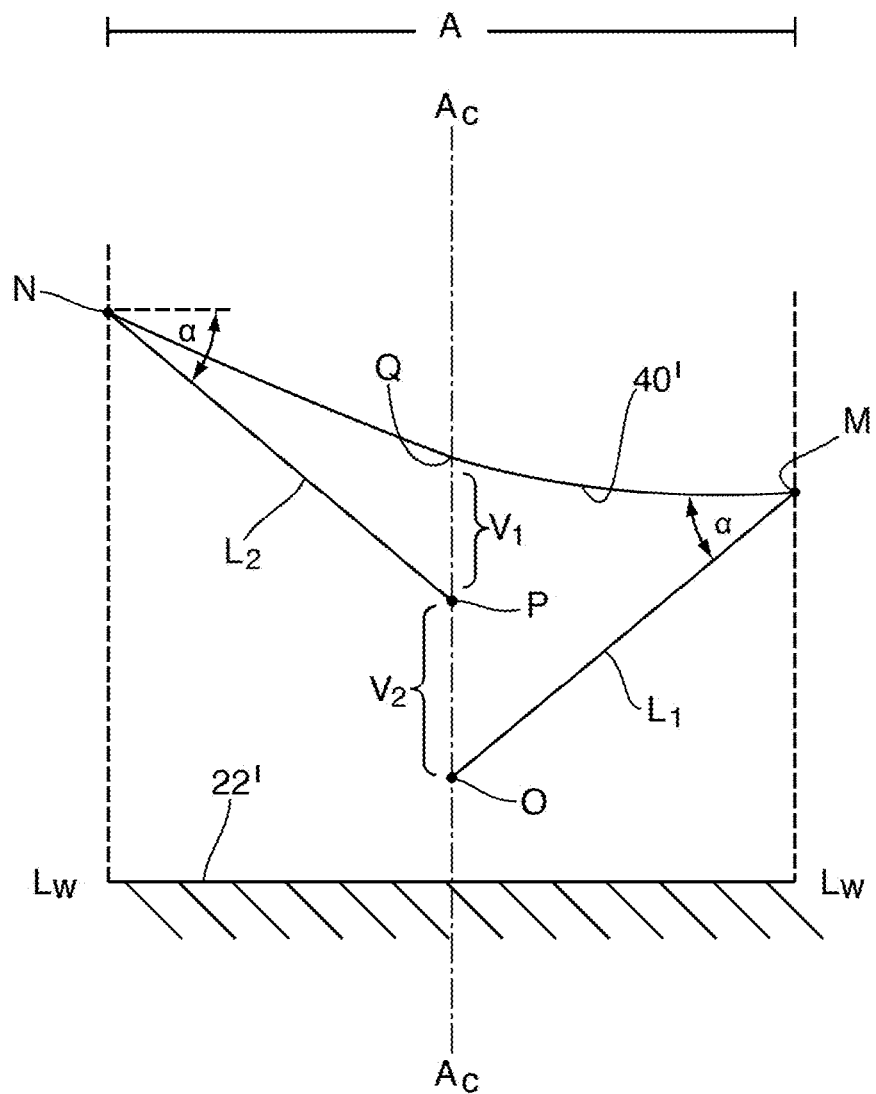
FIG. 4 shows a virtual side view showing the virtual position lies used to generate virtual support structure sidewalls.

The same method of virtually forming support structures may also be employed by the methodology where the distance $V_2$ between the intersection points O,P shown in FIG. 4 is less than the distance $V_1$ between axis point Q, line intersection point P.

Each secondary support axis $A_{S1}$-$A_{S1}$, $A_{S2}$-$A_{S2}$ and associated virtual web 58' is thus oriented parallel to the central support axis $A_C$-$A_C$, between each respective lateral side of the portion A lateral axis $L_W$-$L_W$ and the center axis $A_C$-$A_C$. In one embodiment, the creation of the secondary support axis $A_{S1}$-$A_{S1}$, $A_{S2}$-$A_{S2}$ divides the lateral axis $L_W$-$L_W$ into four asymmetrical sections, with the virtually generated support structures extending in the longitudinal direction to each opposing edge of the associated portion A requiring support.

If necessary, further secondary support axis $A_X$-$A_X$ are established (see for example FIG. 8) parallel to the center axis $A_C$-$A_C$ each spaced between the ends of the lateral axis $L_W$-$L_W$ and the center axis $A_C$-$A_C$.

Using the virtually generated sides $S_1$,$S_2$ and $S_3$,$S_4$, an associated V-shaped cap portion 52 is modelled using the processor 32. As shown in FIG. 5D, for example, the computer 30 is used to virtually modeled sidewall 54a downwardly at the same preselected angle α as side S1 from the edge-most portion of the virtual model 40' which is closest to the virtual printer table 22', until the modeled sidewalls 54a intersects the secondary axis $A_{s1}$-$A_{s1}$. The next sidewall 54b of the virtual cap portion 52 V is then modeled upwardly from the intersection point of the first side $S_1$ with the axis $A_{s1}$-$A_{s1}$ to contact the virtual model 40' at point Q die center axis $A_C$-$A_C$. The virtual model of the support structure 50 is completed by projecting to the virtual printer table 22' the associated support web 58, vertically downwardly from the lower vertex of intersection points of the modeled sidewalls 54a,54b co-planar with the associated support axis $A_{S1}$-$A_{S1}$.

The next adjacent support structure 50 is next virtually modelled with the computer 30 in fame manner based on the virtual sides $S_3$,$S_4$ centered on next adjacent secondary axis $A_{S2}$-$A_{S2}$. As with the first virtual support structure, the adjacent support structure is completed by virtually projecting a virtual support web 58' downwardly from the lower intersection of the sides $S_3$,$S_4$, coplanar with the support axis $A_{S2}$-$A_{S2}$.

In the embodiment shown two longitudinal supports are modelled each aligned with a respective secondary support axis $A_{S1}$-$A_{S1}$ and $A_{S2}$-$A_{S2}$. It is to be appreciated that where the modelled V structures are still too large, the sections shown in FIG. 5 are divided in half again, and the same process to create the V-shaped support structures used.

II. Symmetrical Spaced Support Configuration

Figure 6:
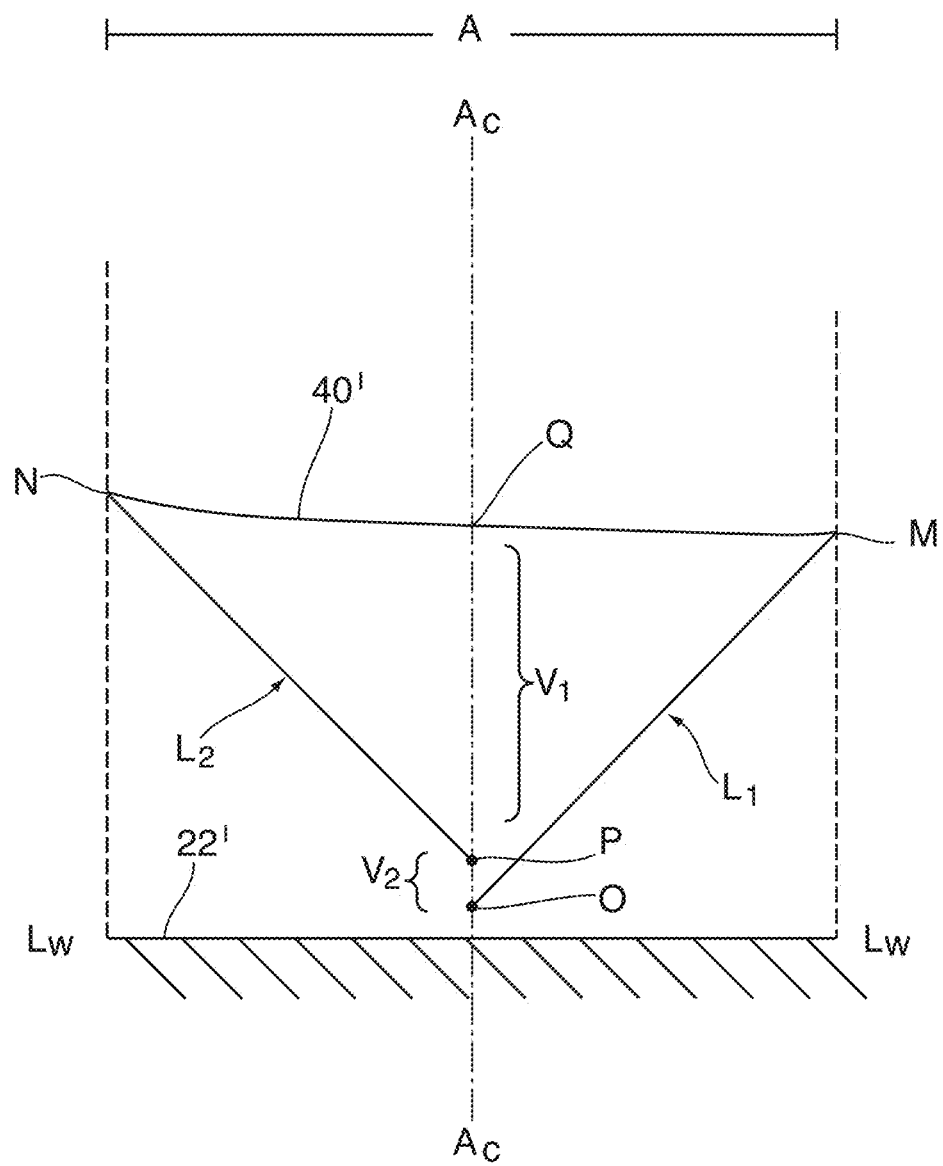
FIGS. 6, 7A and 7B illustrate graphically the identification and virtual generation of the support cap portion geometry under a second selected portion of the target model requiring support in accordance with an alternate mode.
Figure 7A:
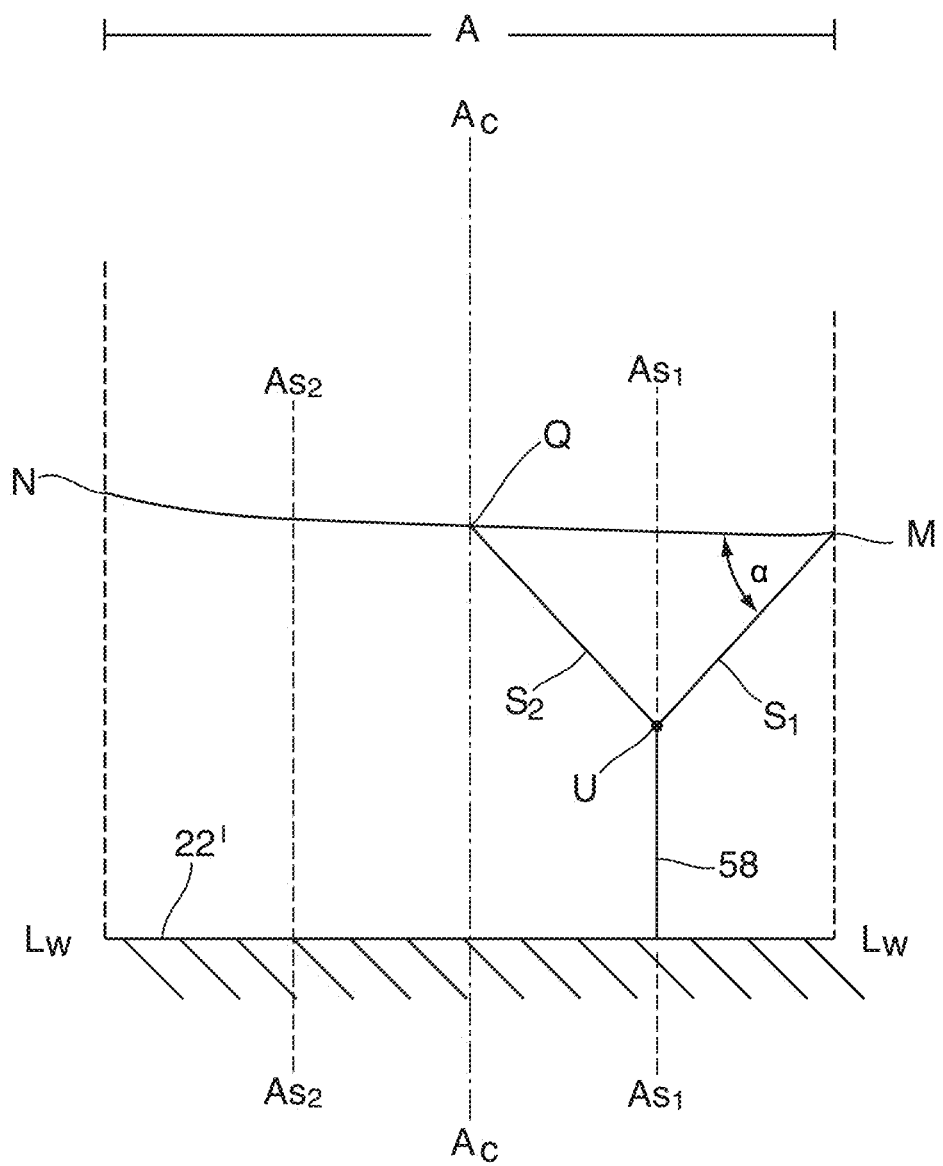
Figure 7B:
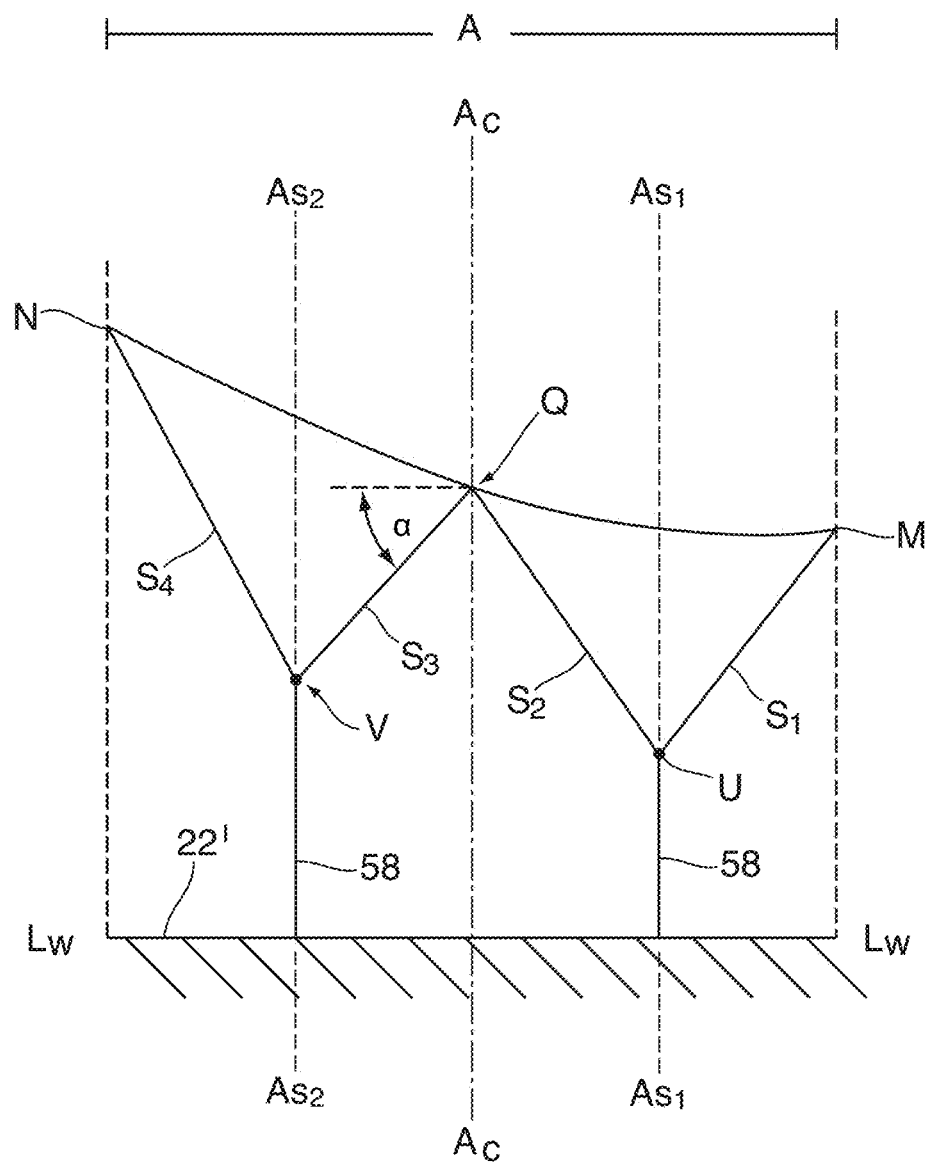

FIGS. 6 and 7A and 7B illustrate graphically an alternate method of modelling of support structures 50 where the portion A of the virtual model 40' requiring support is provided with a curvature whereby lines $L_1$ and $L_2$ are generated in the manner described above with reference to FIG. 4, and the distance V2 between the points of intersection P,O is less than the distance $V_1$ between point Q and the closes intersection point P.

As shown in FIG. 7A, where the distance $V_1$ between the underside of axis point Q of the virtual model 40' to the intersection point P of the closest line ($L_2$) on the vertical plane through center axis $A_C$-$A_C$ is greater than the distance $V_2$ between two intersection points P,O of lines $L_1$, $L_2$, support structures 50 may be formed symmetrically along each side of the axis $A_C$-$A_C$, with an equal and aligned spacing.

Initially, the spacing between the center support axis $A_C$-$A_C$ an each end of the portion A is divided by equally spaced secondary support axis $A_{S1}$-$A_{S1}$, $A_{S2}$-$A_{S2}$ As shown in FIG. 7A, starting at point M on the edge of the virtual model 40' which is spaced closest from the virtual printer table 22', a first cap portion side $S_1$ is projected downwardly at the preselected angle α until it intersects the vertical plane of the first adjacent support axis $A_{S1}$-$A_{S1}$ at point u. From the intersection point u of the first side $S_1$ and axis $A_{S1}$-$A_{S2}$, a second virtual side $S_2$ is projected to intersect with the underside of virtual model 40' at axis point A. As with the modeling of cap portions having asymmetrical spacing, once the sides $S_1, S_2$ the cap portion are modelled, the computer 30 models a virtual web 58, extending virtually from the lower nexus of intersection of the sides $S_1, S_2$ and coplanar with the axis $A_{S1}$-$A_{S1}$ to join with the virtual printer table 22', as a computer modelled support web 58.

FIG. 7B shows the computer modelling of the next adjacent support structure.

From the axis point Q intersection of the underside of the virtual model 40' and axis $A_C$-$A_C$, a virtual side of the next support structure cap portion is generated. The side $S_3$ is extended to in the same direction as side $S_1$ to intersect the next adjacent support axis $A_{S2}$-$A_{S2}$. The side $S_3$ extends al the preselected overhang angle $\alpha$ towards and intersects the axis at point V. From point V, the other virtual side $S_4$ of the next cap portion is extended upwardly to intersect with point N. Once sides $S_3, S_4$ are modelled, a virtual support web 58 is modelled, extending from point V downwardly to the virtual printer table 22', coplanar with the axis $A_{S2}$-$A_{S2}$.

In each case, the sides $S_1, S_2, S_3, S_4$ of the virtual V-shaped cap portion will extend from vertical at an angle equal or less titan the preselected angle $\alpha$.

Following the computer modelling of the sides $S_1, S_2, S_3, S_4$ the computer 30 preferably completes each virtual support structure 50 by virtually infilling the cap portion 52 with print material, such that the target model 40 will be printed directly supported across its underside upwardly to the underside of the raised platform 42. The process is preferably repeated until the portion A is fully troughed in the lateral direction.

Figure 8:
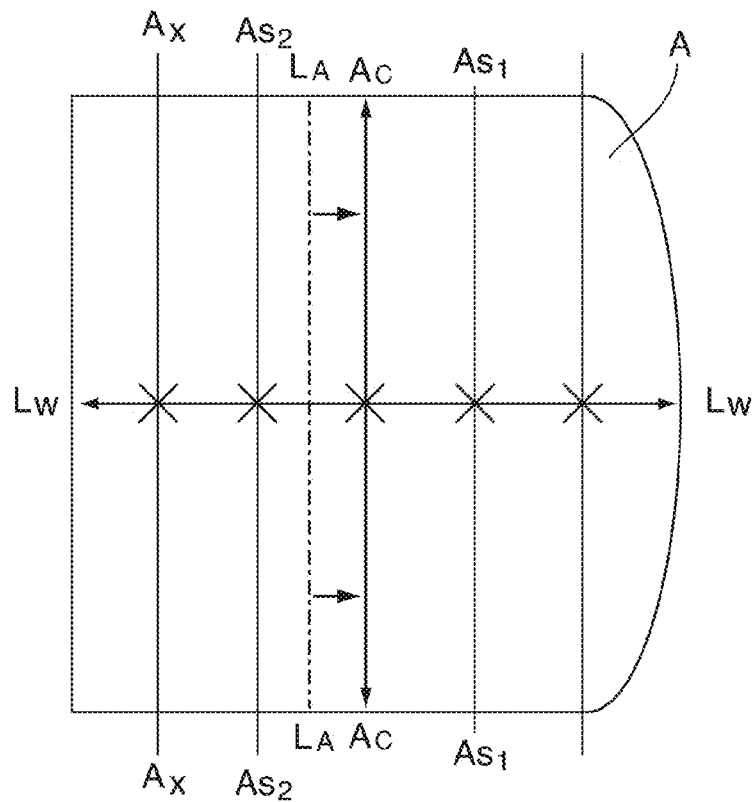
FIG. 8 shows a plan view of selected portion of the target model requiring support, illustrating the determination of central and secondary support axis therealong.
Figure 9:
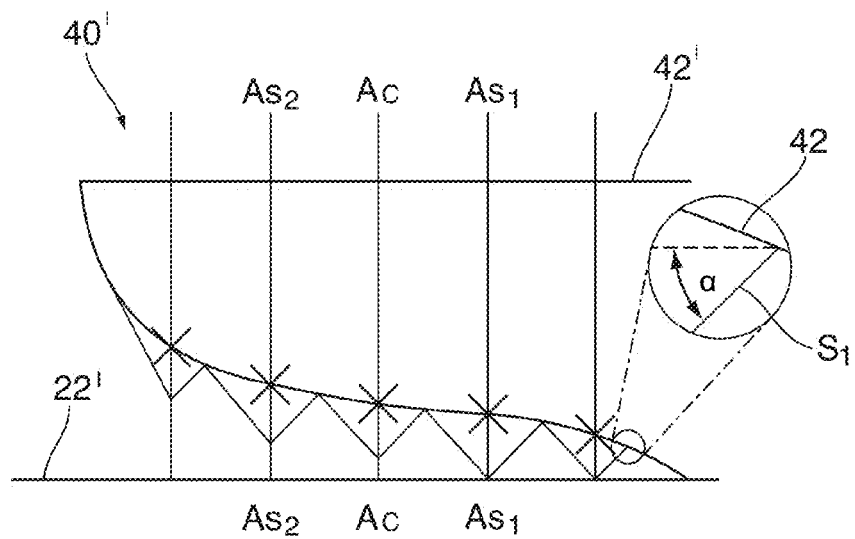
FIG. 9 shows a lateral side view of an identified portion of the target model shown in FIG. 8.

As shown best in FIGS. 8 und 11 where a particular portion of the target model requiring support has a width which exceeds a lateral width of the intersecting sides $S_1, S_2$ and $S_3, S_4$ shown in FIGS. 7A and 7B, additional secondary support axis $A_{S1}$-$A_{S1}$, $A_{S2}$-$A_{S2}$, ... $A_{SN}$-$A_{SN}$ may be generated with the axis being equally spaced. Next adjacent virtual sides are formed, the additional spaced support axis, with respective sides extending between the axis in the same orientation as shown in FIG. 7B.

As will be described, following the computer modelling of the target model 40 and necessary support structures for each portion A,B, processor 32 is then activated to activate the printer 20 to form on the printer table 22 the target model and supports structures 50 in accordance with the modelled image.

Preferably, the printer assembly 10 is operable to allow the operator select whether or not the projected sides 54a, 54b of the cap portion 52 are to touch the printer table 22 or are to be supported by one or more supported webs 58 so as to provide a minimum standoff therefrom.

The computer 30 further preferably includes software which allows the support web 58 of each support structure 50 to be configured with one or more of arches, pillars, and angular members such as beams, cut-out and/or angled walls such as those shown in FIGS. 12B to 12E. Preferably support web reinforcements are constructed of the same material as the target model 40.

In this manner, the processor 32 is used to establish a series of virtual support structures 50 each underlying the portions of the virtual model 42 identified as requiring support, whilst minimizing the amount of printing material and manufacturing time required. Once all the support structures 50 have been designed by the computer model the operator preferably has the option of reviewing and/or editing the design, to refine the support structures for any special considerations. After support structure design is finalised and accepted, it is combined with the initially input data for the target model 40 and submitted for build program development. Automated program development software may then compute and develops the program to build the target model and associated support structure simultaneously layer by layer using a conventional 3D printer.

7. 3D Printing

Following the completion of the virtual computer model 40, the processor 32 is used to actuate the 3D printer 20 to print-form concurrently both support structures 50 in accordance with the generated model, as well as the target model 40 in the configuration corresponding to the modeled image. FIGS. 10 and 11 illustrate the support structures 50 and target model 40 in accordance with one non-limiting embodiment.

With the present invention, where the target model has contoured surface along the length direction, the cap portions 52 are preferably formed so as to follow the model contour.

FIG. 12A illustrates an exemplary support structure 50 which is provided with a cap portion 52 and planar solid support web 58 tor supporting the raised platform 42 as it is printed and cures. FIGS. 12B to 12E illustrate alternate possible support structure 50 constructions, wherein like reference numerals are used to identify like components. As shown in FIG. 12B to 12E, while the preferred embodiment shows the support web 58 as having a solid configuration, the invention is not so limited.

It is to be appreciated that in alternate embodiments, portions of the cap portion 52 may be supported directly on the 3D printing machine table, and may be provided without underlying pillar supports or walls.

FIG. 12B illustrates a support web 58 which includes a support wall provided with a plurality apertures 72. The apertures 72 may be in the form as, diamond or other polygonal shaped holes where the angle of the walls do not at any point exceed the overhang angle of the material. More preferably, as shown in FIGS. 12B and 12C, the apertures 72 are most preferably as diamond-shaped cutouts which form angular webs to reduce the amount of material required. More preferably, the sides of the support web 58 which define each aperture 72 extend at the or less than the predetermined threshold angle a relative to the verticals. FIGS. 12D and 12E illustrate another non-restrictive support web 58 constructions. FIGS. 12D and 12B illustrate further non-restrictive embodiments where for example the support structure 50 support web 58 is provided with reinforcing pillars 76 and/or corresponding arch-shaped openings 78. As with the diamond apertures 72, the slopped sides of the arch shaped openings are preferably angled at or less than the threshold angle $\alpha$ for the printer material. It is to be appreciated, however, that other shaped apertures including slots, grooves, channels and the like could also be used.

The present invention provides various advantages over conventional 3D printing processes, and which include:

1. Robust support structures which may optionally include pillars and a V-shaped bearing cap portion or troughs, and wherein the sides of the cap portion are constructed at no more than the overhang angle of the material being used.

2. The provision of support members which are characterized by V-shaped cap portions which are filled with support material to the bottom surface of the model 3. Support structure cap portions which are supported by planar webs walls and/or pillow, pillars with fanned tops at the overhang angle, as well as support structures having support walls with diamond shaped material reducing holes or apertures; and preferably where the diamond angle is no greater than the overhang angle of the material being used.

4. V-shaped cap portions that follow the contours of the model to provide full three dimensional support.

5. Where required in a given area to be supported, more than more than four troughs may be used.

6. Pillar and/or wail structures are designed for the model size and weight being supported.

7. Support system is optimized for material used against structure complexity that would reduce the printing efficiency of the machine being used.

8. Reduces machine overall printing rime making the machine more productive.

Although the detailed description describes and illustrates various preferred embodiments, the invention is not so limited. Many modifications and variations will now occur to persons skilled in the art. For a definition of the invention reference may be had to the appended claims.

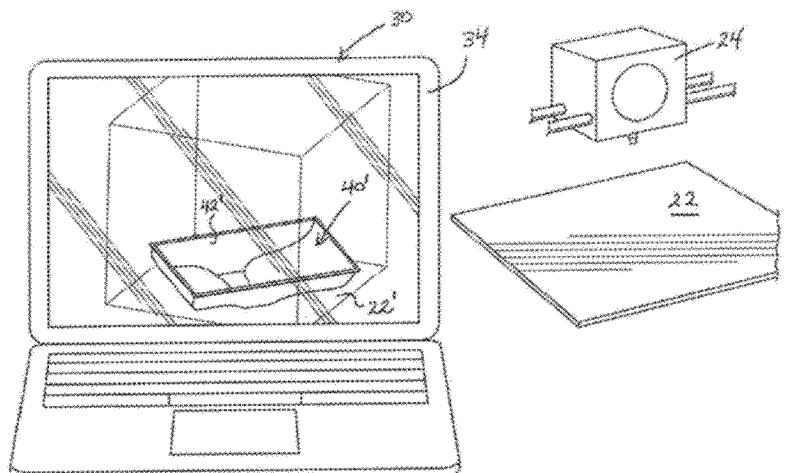

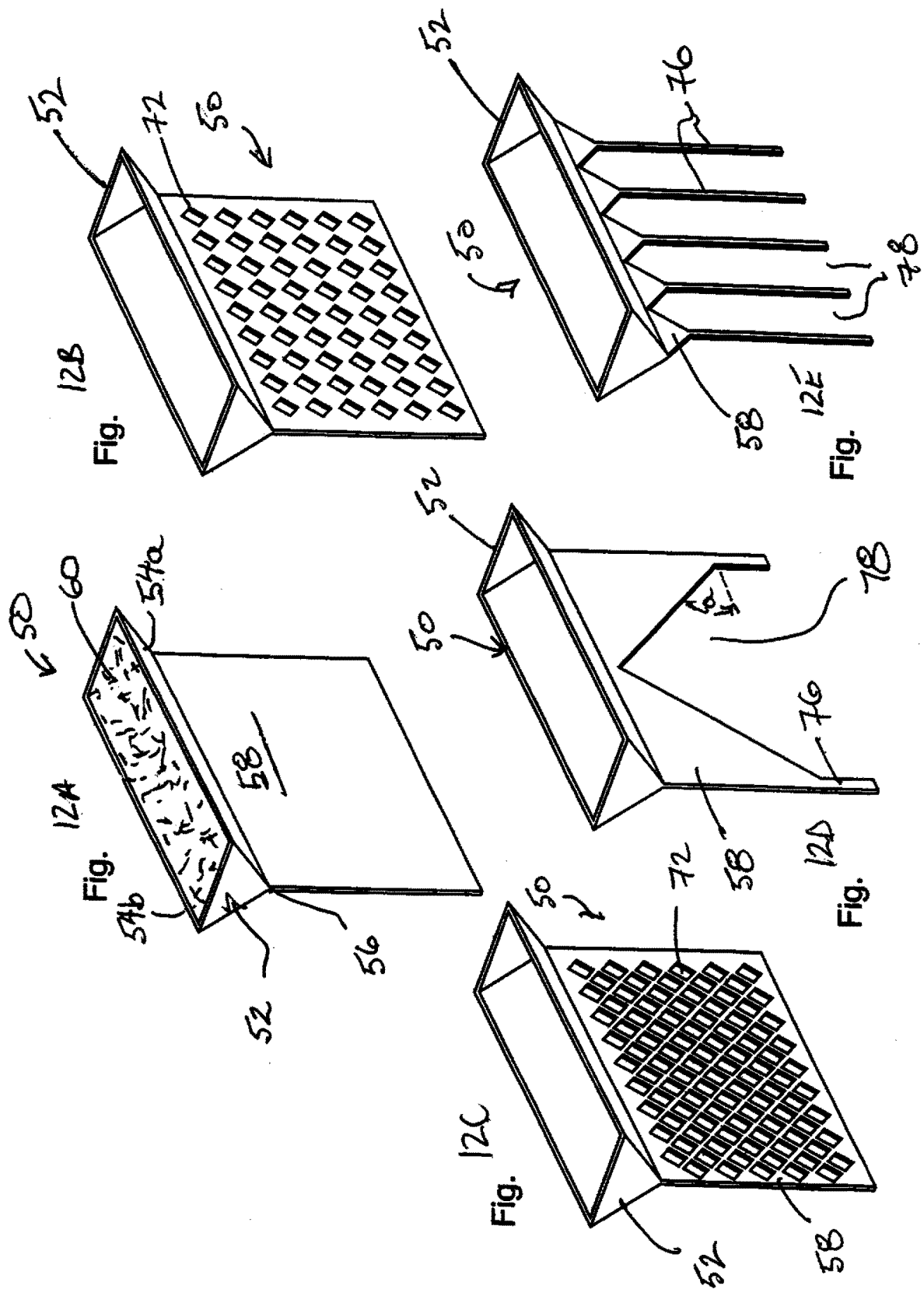

I claim:

1. A process for producing a printed target model formed from a model material using a 3D printer assembly, the 3D printer assembly including a 3D printer having a printer table and a processor having memory actuable to control said 3D printer, wherein the process comprising,
   inputting in said memory target model data representative of the printed target model to be formed,
   using said target model data, identifying target model surface portions of the printed target model requiring support and which orient at an angle exceeding a predetermined threshold angle,
   converting a selected one of said surface portions to an associated planar image in a direction normal to a surface of the printer table,
   identifying a long axis of said associated planar image,
   generating at least one virtual, model support structure for said selected surface portion relative to said printer table, the support structure including a generally V-shaped cap portion, said cap portion including a pair of longitudinally extending planar sidewalls which extend upwardly outward from a lower vertex to an underside of the selected surface portion of the target model requiring support, each of said sidewalls extending laterally at an angel selected at or upto leas than 10° from the predetermined threshold angle,
   and activating with said 3D printer to form by model material layer build-up said target model and said support structures based on said input target model data and said generated virtual model support structures, and separating said target model from said model support structures.

2. The process as claimed in claim 1, wherein following said step of identifying said long axis, identifying a lateral axis normal to said long axis at a widest portion of said associated planar image, and
   wherein generating said virtual model support structure further comprises selecting a symmetrical or asymmetrical configuration for said cap portion side-walls, whereby at a mid-point of said lateral axis identifying a center support axis, parallel to said long axis,
   projecting downwardly inwardly towards the center support axis from each lateral edge of the selected surface portion, a virtual line oriented at an angle selected at or upto 10° less than the predetermined threshold angle,
   measuring the relative spacing between respective points of intersection of the virtual lines along a center support axis vertical plane and the selected surface portion, and
   selecting said sidewall configuration based on the measured relative spacing.

3. The process as claimed in claim 2, further wherein, where the spacing between the respective points of intersection of the vertical lines is greater than a spacing between the selected surface portion and a closest one of said points of intersection,
   said process comprising identifying at least one secondary support axis parallel to said long axis interposed between said center support axis and each end of said lateral axis, and
   virtually modelling said V-shaped cap portion in substantially longitudinal alignment with a selected said secondary support axis by projecting a first said cap portion side laterally downwardly from one lateral edge of the selected surface portion to said selected secondary support axis, and
   from the intersection of the first cap portion side and selected secondary axis projecting said second cap portion side laterally upward to contact the selected surface portion along the central support axis.

4. The process as claimed in claim 2, further wherein, where the spacing between the respective points of intersection of the vertical lines is greater than a spacing between the selected surface portion and a closest one of said points of intersection,
   virtually modelling said V-shaped cap portion in substantially longitudinal alignment with said center support axis by projecting a first said cap portion side laterally downward from a first lateral edge of the selected surface portion to intersect a vertical plane of said center support axis, and
   from the intersection point of the first cap portion side and center support axis vertical plane, projecting said second cap portion side laterally upward to contact the selected surface portion.

5. The process as claimed in claim 1, wherein at least one said generated virtual model support structure further includes a longitudinally oriented generally planar support web and/or a plurality of longitudinally spaced support pillars extending vertically from the lower vertex of said cap portion to said printer table.

6. The process as claimed in claim 5, wherein said support structure further includes at least one reinforcing web spanning between and integral with at least one associated pair of spaced supporting pillars.

7. The process as claimed in claim 1, wherein said predetermined threshold angle is selected as a departure angle from vertical selected at between about 40° and 50°±1.

8. The process as claimed in claim 7, wherein the predetermined threshold angle is selected at least in part on the basis of at least one of the caring properties of the model material and the binding properties of the model material.

9. The process as claimed in claim 7, wherein said model material is recyclable, and preferably comprises a recyclable polymer.

10. The process as claimed in claim 1, wherein said step of forming said support structure comprises depositing by said 3D printer successive layers of said model material to provide said support structure as a built up construction integrally formed with said target model.

11. The process as claimed in claim 10, wherein said model material is selected from the group consisting of a ceramic, a polymer, a cellulose-based and a plastic.

12. The process as claimed in claim 1, wherein said surface portions requiring support are identified on the basis of both the target model geometry and it least one of the curing properties of the model material and the binding properties of the model material.

13. A process for producing a printed target model formed from a model material using a 3D printer assembly, the 3D pricier assembly including a 3D printer having a printer table and processor having memory actuable to control said 3D printer, wherein the process comprising,
  inputting in said memory target model data representative of a virtual target model to be formed,
  using said target model data, identifying target model surface portions of the printed target model which are oriented relative to vertical in n position exceeding a predetermined threshold angle as requiring support, projecting a selected said surface portion us a planar image relative to said printer table, and identifying a long axis of said planar image,
  generating at least one a virtual support structure configured to provide support to said selected surface portion, and said virtual support structure extending longitudinally in the direction of said long axis and comprising a generally vertically elongated base portion extending from a lower end portion to an upper edge portion spaced a distance therefrom, and a cap portion having V-shaped sidewalls disposed at said upper edge portion,
  wherein generating said virtual model support structure including selecting a symmetrical or asymmetrical configuration for said cap portion sidewalls, whereby following said step of identifying said long axis, identifying a lateral axis normal to said long axis at a widest portion of said associated planar image, at a mid-point of said lateral axis, identifying a center support axis, parallel to said long axis,
  projecting downwardly inwardly towards a vertical place at the center support axis from each lateral edge of the selected surface portion, a virtual line oriented at an angle selected at or upto 10° less than the predetermined threshold angle,
  measuring the relative spacing between the respective points of intersection of the virtual lines along the center support axis vertical plane and the selected surface portion, and
  selecting said sidewall configuration based on the measured relative spacing,
  actuating said 3D printer to concurrently integrally form said target model and said support structure on said printer table corresponding to said virtual target model and virtual support structure.

14. The process is claimed in claim 13, further wherein where the spacing between the respective points of intersection of the vertical lines is less than a spacing between the selected surface portion and a closest one of said points of intersection,
  said process comprising identifying at least one secondary support axis parallel to said long axis interposed between said center support axis and each end of said lateral axis, and
  virtually modelling said V-shaped cap portion in substantially longitudinal alignment with a selected said secondary support axis by projecting a first said cap portion side laterally downwardly from one lateral edge of the selected surface portion to said selected secondary support axis, and
  from the intersection of the first cap portion side and selected secondary axis projecting said second cap portion side laterally upward to contact the selected surface portion along the central support axis.

15. The process as claimed in claim 13, further wherein where the spacing between the respective points of intersection of the vertical lines is greater than a spacing between the selected surface portion and a closest one of said points of intersection,
  virtually modelling said V-shaped cap portion in substantially longitudinal alignment with said center support axis by projecting a first said cap portion side laterally downward from a first lateral edge of the selected surface portion to intersect a vertical plane of said center support axis, and
  from the intersection point of the first cap portion side and center support axis vertical plane, projecting said second cap portion side Intensify upward to contact the selected surface portion.

16. The process as claimed in claim 15, wherein said surface portions requiring support are identified on the basis of both the target model geometry and at least one of the curing properties of the model material and the binding properties of the model material.

17. The process as claimed in claim 13, wherein said support structure further includes at least one reinforcing web spanning between and integral with said sidewalls.

18. The process as claimed in claim 13, wherein said predetermined threshold is selected as a departure angle from vertical selected at between about 40° and 50°±1.

19. The process as claimed in claim 18, wherein the predetermined threshold angle is selected at least in part on the basis of at least one of the curing properties of the model material and the binding properties of the model material.

20. The process as claimed in claim 19, wherein said step of forming said support structure comprises depositing by said 3D printer successive layers of said model material to provide said support structure as a built up construction.

21. The process as claimed in claim 20, wherein said model material is selected from the group consisting of a ceramic, a polymer, a cellulose-based material and a plastic.

22. The process as claimed in claim 13, wherein the 3D printer includes a plurality of printer heads, a first said printer head being operable to print form the target model from a first print material, a second said printer head being operable to print form said support structure from a material different from said first print material.

* * * * *

UNITED STATES PATENT AND TRADEMARK OFFICE
CERTIFICATE OF CORRECTION

PATENT NO. : 10,052,812 B2
APPLICATION NO. : 14/993544
DATED : August 21, 2018
INVENTOR(S) : Jill Urbanic It is certified that error appears in the above-identified patent and that said Letters Patent is hereby corrected as shown below:

On the Title Page

Under ABSTRACT "22 Claims, 14 Drawing Sheets" should read --22 Claims, 15 Drawing Sheets-- as attached.

In the Drawings

Please add Drawing Sheet 15, containing FIGS. 12A, 12B, 12C, 12D and 12E attached hereto.

Signed and Sealed this
Twenty-fourth Day of May, 2022

Katherine Kelly Vidal
*Director of the United States Patent and Trademark Office*

(12) United States Patent
Urbanic

(10) Patent No.: US 10,052,812 B2
(45) Date of Patent: Aug. 21, 2018

(54) METHOD OF REDUCING AND OPTIMISING PRINTED SUPPORT STRUCTURES IN 3D PRINTING PROCESSES

(71) Applicant: UNIVERSITY OF WINDSOR, Windsor (CA)

(72) Inventor: Jill Urbanic, Windsor (CA)

(73) Assignee: UNIVERSITY OF WINDSOR, Windsor, ON (CA)

( * ) Notice: Subject to any disclaimer, the term of this patent is extended or adjusted under 35 U.S.C. 154(b) by 466 days.

(21) Appl. No.: 14/993,544

(22) Filed: Jan. 12, 2016

(65) Prior Publication Data
US 2016/0200051 A1  Jul. 14, 2016

Related U.S. Application Data

(60) Provisional application No. 62/102,627, filed on Jan. 13, 2015.

(51) Int. Cl.
| | |
|---|---|
| *B29C 67/00* | (2017.01) |
| *B28B 1/00* | (2006.01) |
| *B29C 64/106* | (2017.01) |
| *B29C 64/386* | (2017.01) |
| *B29C 64/40* | (2017.01) |
| *B33Y 10/00* | (2015.01) |
| *B33Y 50/02* | (2015.01) |
| *B29K 1/00* | (2006.01) |
| *B29K 105/00* | (2006.01) |

(52) U.S. Cl.
CPC .......... *B29C 64/106* (2017.08); *B29C 64/386* (2017.08); *B29C 64/40* (2017.08); *B29K 2001/00* (2013.01); *B29K 2105/0058* (2013.01); *B29K 2995/0037* (2013.01); *B33Y 10/00* (2014.12); *B33Y 50/02* (2014.12)

(58) Field of Classification Search
CPC ..... B29C 64/40; B29C 64/386; B29C 64/106; B33Y 50/02; B33Y 10/00; B29K 2001/00; B29K 2105/0058; B29K 2995/0037
See application file for complete search history.

(56) References Cited

U.S. PATENT DOCUMENTS

| | | | | |
|---|---|---|---|---|
| 5,345,391 A * | 9/1994 | Hull | .......... | B29C 64/40 |
| | | | | 156/273.3 |
| 5,943,235 A * | 8/1999 | Earl | .......... | B29C 41/36 |
| | | | | 345/420 |
| 6,193,923 B1 * | 2/2001 | Leyden | .......... | B29C 41/12 |
| | | | | 264/308 |
| 7,591,078 B2 * | 9/2009 | Crampton | .......... | B25J 13/088 |
| | | | | 33/503 |
| 8,496,474 B2 * | 7/2013 | Chishti | .......... | A61C 7/00 |
| | | | | 433/24 |
| 2005/0253308 A1 * | 11/2005 | Sherwood | .......... | B29C 35/0805 |
| | | | | 264/497 |

(Continued)

*Primary Examiner* — Ramesh Patel

(57) ABSTRACT

A printed target model is formed by 3D printing by inputting target model data, and based on target model data, identifying surface portions requiring support. The surface portions are projected onto a virtual printer table, and one or more virtual support structures having a V-shaped cap portion and optionally a generally planar web are created therefore. The virtual model is then used to control a 3D printer to integrally print-form the target model and support structures.

22 Claim, 15 Drawing Sheets